May 23, 1939.    C. C. FARMER    2,159,788
FLUID PRESSURE BRAKE
Filed June 2, 1937
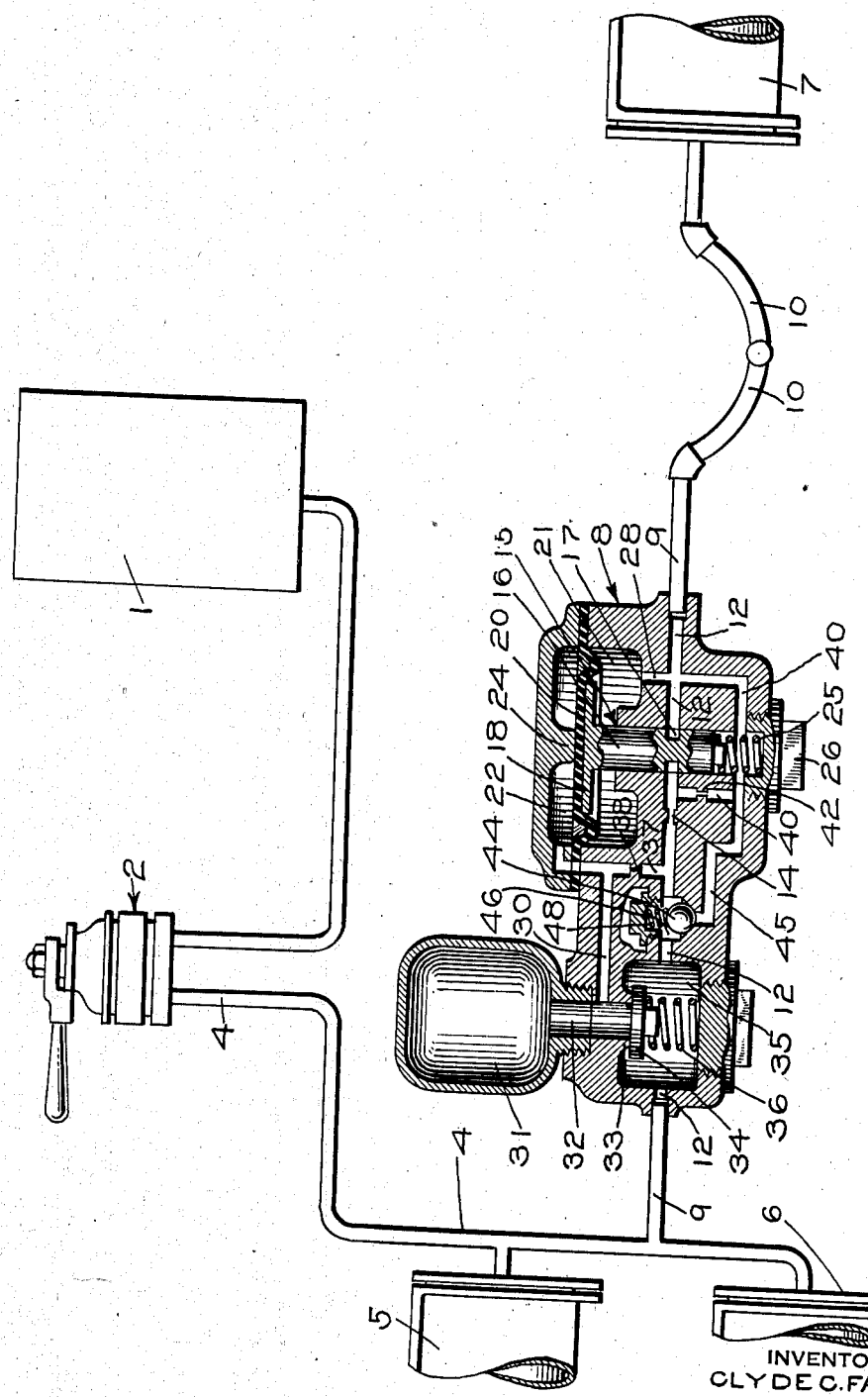
INVENTOR
CLYDE C. FARMER
BY Wm. M. Cady
ATTORNEY Patented May 23, 1939

2,159,788

UNITED STATES PATENT OFFICE 2,159,788

FLUID PRESSURE BRAKE

Clyde C. Farmer, Pittsburgh, Pa., assignor to The Westinghouse Air Brake Company, Wilmerding, Pa., a corporation of Pennsylvania Application June 2, 1937, Serial No. 145,975

23 Claims. (Cl. 303—84)

This invention relates to a vehicle fluid pressure brake equipment, and more particularly to improved means for controlling the supply of fluid under pressure from an application device to a brake cylinder through a pipe where there is more than usual danger of breakage or rupture of the pipe, or of the development of a leak of serious proportions.

The brake equipment for certain types of vehicles, such as for a locomotive and tender, includes a plurality of brake cylinders which are supplied with fluid under pressure from a common source, which may be the main reservoir on the locomotive. Some of these brake cylinders are mounted on the locomotive, and some of them are mounted on the tender. Fluid under pressure is supplied to these brake cylinders through a common supply pipe, a branch of which is connected to the brake cylinder on the tender through flexible hose and couplings.

The brake cylinder on the tender is of relatively large size, and in order to secure a rapid application of the brakes on the tender, it is necessary to employ a pipe of large flow capacity to supply fluid under pressure to the tender brake cylinder.

If for any reason the pipe leading to the tender brake cylinder is broken, or the hose and couplings become disconnected, or if as a result of a similar condition, fluid is released from this pipe during an application of the brakes, fluid may be released from the source so rapidly that the pressure therein cannot be maintained by the air compressors associated therewith. In addition, as a result of the rapid release of fluid from the branch of the supply pipe leading to the tender brake cylinder, the pressure of the fluid in the other brake cylinders supplied from the supply pipe will be reduced, and there will be a partial or complete failure of the brakes on the locomotive.

It is an object of this invention to provide a control device adapted to be interposed in the pipe leading to a brake cylinder, and operative to restrict the rate of flow of fluid through the pipe after a time interval if the pressure of the fluid in the brake cylinder does not build up in the normal manner.

A further object of the invention is to provide a control device of the type described which incorporates means to permit the supply of fluid under pressure to the brake cylinder at a restricted rate at all times, to thereby prevent a failure of the supply of fluid to the brake cylinder as a result of improper operation of the control device.

Another object of the invention is to provide an improved control device of the type described, and which corporates means to permit a rapid flow of fluid from the brake cylinder to thereby permit a rapid release of the brakes.

A further object of the invention is to provide a control device of the type described which is responsive to the pressure of the fluid in a timing reservoir to which fluid is supplied at a restricted rate on the supply of fluid to the brake cylinder, and incorporating means operative on the release of fluid from the brake cylinder to release fluid from the timing reservoir at a rapid rate.

Another object of the invention is to provide a control device of the type described which is simple and rugged in construction, and which is positive in operation.

A further object of the invention is to provide an improved control device of the type described.

Other objects of the invention and features of novelty will be apparent from the following description taken in connection with the accompanying drawing, the single figure of which is a diagrammatic view, largely in section, of a brake equipment incorporating a control device embodying my invention.

Referring to the drawing, there is shown therein a vehicle brake equipment which may be employed on a locomotive and tender, although it may be employed on a vehicle of another type, such as a vehicle having truck mounted brake cylinders which are supplied with fluid under pressure through pipes having sections of flexible hose interposed therein. As shown, the brake equipment comprises a reservoir 1, which may be the main reservoir on a locomotive, and which is charged with fluid under pressure in the usual manner by a suitable air compressor, not shown.

A brake application valve device indicated generally by the reference numeral 2 is provided, and may be of any suitable well known construction. The application valve device 2 controls the supply of fluid from the reservoir 1 to a supply pipe 4 leading to brake cylinders 5 and 6, which may be mounted on the locomotive, and to a brake cylinder 7, which may be mounted on the tender for the locomotive. The application valve device 2 also controls the release of fluid under pressure from the supply pipe 4.

The control device provided by this invention is indicated generally by the reference numeral 8, and is interposed in the branch pipe 9 leading from the supply pipe 4 to the tender brake cylinder 7 at a point in this pipe between the supply pipe 4 and the flexible hose and couplings 10 by means of which connection is established between the locomotive and tender.

The control device 8 comprises a body having a passage 12 therein to one end of which is connected the end of the branch pipe 9 leading from the supply pipe 4, while the other end of the passage 12 has connected thereto the portion of the branch pipe 9 leading to the brake cylinder 7. The passage 12 has interposed therein a choke or restriction 14, which is adapted to permit fluid under pressure to flow to the brake cylinder 7 at a relatively rapid rate, but sufficiently restricted to provide for a purpose to be hereinafter described, an effective pressure differential between the pressure of the fluid in the passage 12 at the supply side of the choke 14, and the pressure of the fluid in the brake cylinder side of the choke 14 when there is a flow of fluid under pressure through the passage.

The control device 8 includes valve means 15 for controlling the supply of fluid under pressure through the passage 12 to the tender brake cylinder 7. As shown the valve means 15 comprises a stem or plunger 16 mounted in a bore in the body of the control device 8, and having therein an annular groove 17, which in one position of the stem 16 registers with the ends of the passage 12 to permit communication through the passage 12.

The stem 16 has formed integral therewith an enlarged head 18 which engages one face of a diaphragm 20, which is subject on one side to the pressure of the fluid in an operating chamber 21, and is subject on the other side to the pressure of the fluid in a pressure chamber 22.

The body of the control device 8 has a projection indicated at 24 formed thereon, and adapted to be engaged by a face of the diaphragm 20. A coil spring 25 extends between the lower end of the stem 16 and a threaded plug 26, and yieldingly urges the stem 16 upwardly, as viewed in the drawing, so that the diaphragm 20 engages the projection 24. In this position of the stem 16, the groove 17 therein is in registration with the passage 12 to permit the flow of fluid through this passage.

The operating chamber 21 is connected by way of a passage 28 with the passage 12 at a point therein on the side of the choke or restriction 14 adjacent brake cylinder 7. It will be seen also that the passage 28 communicates with the passage 12 at a point therein on the side of the valve means 15 adjacent the brake cylinder 7.

The pressure chamber 22 is constantly connected by way of a passage 30 with a timing or volume reservoir 31, which is connected to a relatively large passage 32 which is open to the area within a seat rib 33. A check valve 34 is provided, and is mounted in a chamber 35 which is interposed in the passage 12. A coil spring 36 is mounted in the chamber 35, and yieldingly presses the check valve 34 against the seat rib 33 to cut off the flow of fluid from the chamber 35 to the passage 32, and thus to the reservoir 31 and the pressure chamber 22.

The body of the control device 8 has a passage 37 formed therein leading to the passage 30 from the passage 12 at a point therein on the side of the choke 14 adjacent the supply pipe 4. This passage has a choke or restriction 38 interposed therein.

The control device 8 incorporates a passage which by-passes the valve means 15 and through which fluid under pressure may flow at a restricted rate from the supply pipe 4 to the brake cylinder 7. As shown in the drawing there is a passage 40 one end of which communicates with the passage 12 at a point therein on the side of the choke 14 remote from the supply pipe 4, but also on the side of the valve means 15 adjacent the supply pipe 4. The other end of the passage 40 communicates with the passage 12 at a point therein on the side of the valve means 15 adjacent the brake cylinder 7. The passage 40 has interposed therein a choke 42 of substantially smaller flow capacity than the choke 14.

The control device 8 provided by this invention incorporates means to permit a rapid release of fluid under pressure from the brake cylinder 7 on the release of fluid from the supply pipe 4. As shown, a check valve 44 is provided and engages a seat surrounding the end of a passage 45 leading from the passage 40. The check valve 44 is mounted in a chamber 46 through which the passage 12 extends. The chamber 46 is located on the side of the choke 14 adjacent the supply pipe 4, while a coil spring 48 is mounted in the chamber 46 and yieldingly presses the check valve 44 to the seated position to prevent flow of fluid from the passage 12 to the passage 45 and thence to the brake cylinder 7.

The control device 8 is shown in the drawing in the position which it assumes when the brakes are released, at which time the application valve device 2 connects the supply pipe 4 to the atmosphere. If it is desired to apply the brakes, the application valve device is operated to cut off the connection between the supply pipe 4 and the atmosphere, and to supply fluid under pressure from the reservoir 1 to the supply pipe 4.

On the supply of fluid under pressure to the supply pipe 4, fluid flows to the locomotive brake cylinders 5 and 6, and also to the branch pipe 9 leading to the tender brake cylinder 7.

On the supply of fluid under pressure to the branch pipe 9, fluid flows to the chamber 35, but as the check valve 34 is held in the seated position by the spring 36, fluid cannot flow to the passage 32 leading to the timing reservoir 31 and to the pressure chamber 22.

Fluid under pressure supplied to the passage 12 also flows to the chamber 46, but as the check valve 44 is held in the seated position by the spring 48, fluid under pressure cannot flow from the chamber 46 to the passage 45, and thence by way of the passage 40 to the brake cylinder 7.

Fluid under pressure supplied to the passage 12 flows through the choke or restriction 14, and around the annular groove 17 in the stem 16 of the valve means 15 to the portion of the passage 12 to which is connected the portion of the branch pipe 9 leading to the tender brake cylinder 7.

Fluid under pressure supplied to the portion of the passage 12 to which is connected the portion of the branch pipe 9 leading to the tender brake cylinder 7, flows by way of the passage 28 to the operating chamber 21 at the face of the diaphragm 22.

On the supply of fluid under pressure to the brake cylinder 7 there will be an increase in the pressure of the fluid therein, assuming that the pipe connections leading to the brake cylinder remain intact, while there will be a corresponding increase in the pressure of the fluid in the operating chamber 21 at the face of the diaphragm 20.

On the supply of fluid under pressure from the supply pipe 4 through the branch pipe 9 to the passage 12 in the control device 8, fluid under pressure flows at a restricted rate through the choke 38 to the passage 30 to gradually increase the pressure of the fluid in the pressure chamber 22 at the face of the diaphragm 20, and in the volume or timing reservoir 31.

Because of the volume of the timing reservoir 31 and of the pressure chamber 22, and because of the relatively small flow capacity of the choke 38, the increase in the pressure of the fluid in the timing reservoir 31 and in the pressure chamber 22 will be less rapid than the increase in the pressure of the fluid in the brake cylinder 7 and in the operating chamber 21, and, as a result, the spring 25 will maintain the valve means 15 in the position in which the groove 17 establishes communication through the passage 12.

As a result, therefore, fluid under pressure may flow from the supply pipe 4 to the brake cylinder 7 at a rapid rate through the choke 14 to produce a rapid increase in the pressure of the fluid in the tender brake cylinder 7, and a correspondingly rapid application of the brakes controlled by this brake cylinder.

When the desired degree of brake application has been secured, the application valve device 2 is moved to the lap position, in the usual manner. In lap position, the supply of fluid under pressure to the supply pipe 4 is cut off, and thereafter fluid under pressure flows from the passage 12 through the choke 38 to the passage 30, and thence to the pressure chamber 22 and the volume or timing reservoir 31, until the pressure of the fluid in the pressure chamber 22 and in the reservoir 31 has equalized with the pressure of the fluid in the brake cylinder 7.

At this time, as the pressure of the fluid in the pressure chamber 22 and in the operating chamber 21 is substantially equal, the valve means 15 is maintained by the spring 25 in the position in which the groove 17 establishes communication through the passage 12.

In order to release the brakes following an application, the application valve device 2 is operated to cut off the supply of fluid under pressure to the supply pipe 4, and to connect the supply pipe 4 to the atmosphere to release fluid therefrom.

On movement of the application valve device 2 to the release position, fluid flows from the locomotive brake cylinders 5 and 6 to the supply pipe 4, and thence to the atmosphere to reduce the pressure of the fluid in these brake cylinders. In addition, fluid under pressure flows from the tender brake cylinder 7 by way of the branch pipe 9 to the passage 12, through the groove 17 in the stem 16 of the valve means 15 to the other portion of the passage 12, through the choke or restriction 14, and thence through the chambers 46 and 35 to the portion of the branch pipe 9 which is connected to the supply pipe 4. Fluid released from the brake cylinder 7 flows to the supply pipe 4 and is vented to the atmosphere through the application valve device 2.

In addition, fluid under pressure flows from the brake cylinder 7 to the passage 40, and thence by way of the passage 45 and past the check valve 44, which is moved to the open position against the spring 48, to the chamber 46 from which it flows by way of the passage 12 through the chamber 35, and thence to the portion of the branch pipe 9 which is connected to the supply pipe 4. It will be seen that fluid under pressure released from the brake cylinder 7 past the check valve 44 by-passes the choke 14, with the result that the rate of release of fluid from the brake cylinder is not limited by the flow capacity of the choke 14, and accordingly the brakes may be released at a rapid rate.

On the release of fluid under pressure from the supply pipe 4, there is a reduction in the pressure of the fluid in the chamber 35, and the higher pressure of the fluid in the timing reservoir 31, and in the pressure chamber 22, operating on the face of the check valve 34 within the seat rib 33, moves the check valve 34 against the spring 36 to release fluid under pressure from the timing reservoir 31 and the pressure chamber 22 to the chamber 35, from which it flows by way of the branch pipe 9 to the supply pipe 4.

The release of fluid under pressure from the pressure chamber 22 and the timing reservoir 31 occurs at a relatively rapid rate because of the relatively large flow capacity of the passage 32, and accordingly the pressure of the fluid in the pressure chamber 22 is reduced at least as rapidly as the pressure in the operating chamber 21 at the opposite face of the diaphragm 20 is reduced, and, accordingly, the diaphragm 20 is maintained in engagement with the projection 24 by the fluid in the operating chamber 21, assisted by the spring 25, with the result that the valve means 15 is maintained in the position in which the groove 17 establishes communication between the two portions of the passage 12.

If the branch pipe 9 leading to the tender brake cylinder 7 is broken, or develops a leak of serious proportions, the control device 8 provided by this invention will operate to restrict the supply of fluid through the pipe leading to the tender brake cylinder 7 to thereby prevent the depletion of the supply of fluid under pressure to the locomotive brake cylinders 5 or 6, or in the reservoir 1, and consequent failure of the brakes.

Assuming that the branch pipe 9 is ruptured or leaking at a point intermediate the control device 8 and the brake cylinder 7, then on the supply of fluid under pressure to the supply pipe 4 to effect an application of the brakes, fluid will flow to the branch pipe 9, and through the passage 12 and choke 14 in the control device 8. As it is assumed that the branch pipe 9 is ruptured at a point intermediate the brake cylinder 7 and the control device 8, fluid under pressure supplied from the control device 8 to the branch pipe 9 will not reach the brake cylinder 7, and no back pressure will be developed in the branch pipe 9 or in the portion of the passage 12 on the side of the choke 14 remote from the supply pipe 4, or back pressure will not develop as rapidly as it does when the connections to the brake cylinder remain intact. Accordingly, there will be no increase in the pressure of the fluid in the operating chamber 21, or this increase will not occur as rapidly as it normally does.

On the supply of fluid under pressure from the supply pipe 4 to the branch pipe 9, there is an increase in the pressure of the fluid in the portion of the branch pipe 9 and of the passage 12 on the side of the choke 14 adjacent the supply pipe 4, and fluid under pressure flows through the choke 38 to the passage 30 leading to the pressure chamber 22 and to the timing reservoir 31.

As a result of the supply of fluid under pressure to the timing reservoir 31 and the pressure chamber 22, the pressure of the fluid therein will increase more rapidly than the pressure of the fluid in the operating chamber 21 is increased at this time, and the force exerted by the fluid in the pressure chamber 22 upon the diaphragm 20 will exceed the opposing force of the spring 25, and of the fluid under pressure present in the operating chamber 21. As a result, the diaphragm 20 will operate to move the valve means 15 against the spring 25, thereby moving the annular groove 17 out of registration with the portions of the passage 12 to thereby cut off the supply of fluid under pressure from the supply pipe 4 to the portion of the branch pipe 9 connected to the tender brake cylinder 7.

On operation of the valve means 15 to cut off the flow of fluid through the passage 12, fluid under pressure supplied from the supply pipe 4 through the choke 14 flows at a restricted rate through the choke 42 to the passage 40, and thence to the portion of the passage 12 to which is connected the portion of the branch pipe 9 leading to the chamber 10. The flow capacity of the choke 42 is substantially less than the flow capacity of the choke 14, and is proportioned to permit fluid under pressure to flow therethrough at a rate less rapid than the compressor associated with the reservoir 1 is capable of supplying fluid under pressure thereto, with the result that the air compressor is able to maintain the pressure of the fluid in the reservoir 1, even though fluid under pressure is constantly released therefrom through the choke 42.

The by-pass passage 40, including the choke 42, comprises means to supply fluid under pressure to the brake cylinder 7 at a restricted rate if the control device 8 is rendered inoperative at a time when the branch pipe 9 leading to the brake cylinder 7 remains intact. This prevents failure of the brakes controlled by the brake cylinder 7 as the result of improper operation of the control device 8.

On a subsequent release of the brakes by operation of the application valve device 2, fluid under pressure is released from the supply pipe 4, while fluid under pressure present in the timing reservoir 31, and in the pressure chamber 22, flows past the check valve 34 to the chamber 35, and thence to the supply pipe 4, as explained above. On this reduction in the pressure of fluid in the chamber 22, the valve means 15 is returned by the spring 25 to the position in which the annular groove 17 establishes communication between the portions of the passage 12, and the control device 8 is conditioned to again permit the supply of fluid under pressure through the branch pipe 9 at a rapid rate.

In addition upon the release of fluid under pressure from the supply pipe 4 by the application device 2, any fluid under pressure present in the brake cylinder 7 may flow therefrom through the passages 40 and 45, and past the check valve 44 to the chamber 46, and thence to the supply pipe 4. The passages 40 and 45 provide means by which fluid under pressure may be released from the brake cylinder 7 in the event that the valve means 15 should remain in the position in which it cuts off communication through the passage 12.

The control device 8 provided by this invention is also operative to restrict the flow of fluid under pressure from the supply pipe 4 through the branch pipe 9, if during an application of the brakes, the branch pipe 9 is broken or develops a serious leak.

On an application of the brakes, fluid under pressure is supplied to the operating chamber 21, and to the pressure chamber 22, until the pressure of the fluid in these chambers is substantially equalized, as explained in detail above. If after the application of the brakes is effected, the portion of the branch pipe 9 leading from the control device 8 to the brake cylinder 7 is ruptured or broken, there will be a rapid reduction in the pressure of the fluid in the portion of the passage 12 on the side of the choke 14 adjacent the brake cylinder 7, and a corresponding reduction in the pressure of the fluid in the operating chamber 21. Because of the presence of the choke 14, however, there will not be an equal reduction in the pressure of the fluid in the passage 12 on the side of the choke 14 remote from the brake cylinder 7.

Accordingly, the fluid in the chamber 22 and in the timing reservoir 31, will be maintained at a somewhat higher pressure than the fluid in the operating chamber 21, and the higher pressure of the fluid in the pressure chamber 22 will cause the diaphragm 20 to move the valve means 15 against the spring 25 to cut off the flow of fluid through the passage 12, with the result that thereafter fluid may flow from the supply pipe 4 to the portion of the branch pipe 9 connecting the control device 8 and the brake cylinder 7 only through the choke 42. This restricts the rate of flow of fluid from the supply pipe 4, and prevents depletion of the fluid under pressure in the brake cylinders 5 and 6, and in the reservoir 1, and thereby prevents a failure of the brakes.

It will be seen that the control device provided by this invention is adapted to be interposed in the supply pipe leading from an application device to a brake cylinder, and that it operates in the event of a failure of the pressure of the fluid in the brake cylinder to increase in the normal manner, to restrict the rate of flow of fluid from the supply pipe to the brake cylinder, and thereby prevent a depletion of the supply of fluid under pressure in the source, or in other brake cylinders which are supplied by the supply pipe.

It will be seen also that the control device provided by this invention incorporates a by-pass passage through which fluid under pressure may be supplied to the brake cylinder at a restricted rate to thereby permit the supply of fluid under pressure to the brake cylinder in the event that the control device fails to function in the intended manner.

Furthermore, it will be seen that the control device provided by this invention incorporates a by-pass passage extending around the valve means associated therewith, and through which fluid under pressure may be released from the brake cylinder at a rapid rate to thereby permit the release of fluid under pressure from the brake cylinder in the event that the valve means incorporated in the control device fails to function in the intended manner, and to also permit the release of fluid under pressure from the brake cylinder at an extremely rapid rate.

In addition, it will be seen that the control device provided by this invention includes valve means subject to the opposing pressures of the fluid in a timing or volume reservoir, and of the fluid in an operating chamber open to the pipe leading to the brake cylinder, and that on a reduction in the pressure of the fluid in the supply pipe, fluid is released at a rapid rate from the volume or timing reservoir to quickly condition the control device for operation on the next application of the brakes.

While one embodiment of the improved control device provided by this invention has been illustrated and described in detail, and while it has been described in connection with the brake equipment for a locomotive and tender, it is to be understood that the invention is not limited to the details of construction shown and described, nor is the control device limited to use on a locomotive brake equipment, and that numerous changes and modifications may be made without departing from the scope of the following claims.

Having now described my invention, what I claim as new and desire to secure by Letters Patent, is:

1. In a vehicle fluid pressure brake equipment, in combination, a source of fluid under pressure, a brake cylinder, application means for supplying fluid under pressure from said source to a communication through which fluid under pressure may be supplied to the brake cylinder through a restriction, a volume chamber, means for supplying fluid under pressure to said volume chamber at a restricted rate from a point in said communication intermediate said restriction and the application means, and valve means subject to the opposing pressures of the fluid in said volume chamber and of fluid supplied from said communication through an always open passage at a point therein intermediate the restriction and brake cylinder for controlling the flow of fluid through said communication.

2. In a vehicle fluid pressure brake equipment, in combination, a source of fluid under pressure, a brake cylinder, application means for supplying fluid under pressure from said source to a communication through which fluid under pressure may be supplied to the brake cylinder through a restriction, a volume chamber, means for supplying fluid under pressure to said volume chamber at a restricted rate from a point in said communication intermediate said restriction and the application means, valve means subject to the opposing pressures of the fluid in said volume chamber and of the fluid in said communication at a point therein intermediate the restriction and brake cylinder for controlling the flow of fluid through said communication, and an always open by-pass passage extending around said valve means and through which fluid may flow from the application means to the brake cylinder.

3. In a vehicle fluid pressure brake equipment, in combination, a source of fluid under pressure, a brake cylinder, application means for supplying fluid under pressure from said source to a communication through which fluid under pressure may be supplied to the brake cylinder through a restriction, a volume chamber, means for supplying fluid under pressure to said volume chamber at a restricted rate from a point in said communication intermediate said restriction and the application means, valve means constantly subject to the opposing pressures of the fluid in said volume chamber and of the fluid in said communication at a point therein intermediate the restriction and brake cylinder for controlling the flow of fluid through said communication, and a by-pass passage extending around said valve means and through which fluid may flow from the application means to the brake cylinder at a less rapid rate than through said restriction.

4. In a vehicle fluid pressure brake equipment, in combination, a plurality of brake cylinders, application means for supplying fluid under pressure to a communication through which fluid under pressure may be supplied to said brake cylinders, and a valve device for controlling the supply of fluid from said communication to one of said brake cylinders, said valve device comprising a body having a passage therein through which fluid is supplied from said communication to said brake cylinder, said passage having a restriction interposed therein, a timing reservoir, means for supplying fluid to said reservoir at a restricted rate from a point in said passage on the side of the restriction remote from the brake cylinder, valve means subject to the opposing pressures of the fluid in said timing reservoir and of the fluid in a chamber constantly open to said passage at a point in said passage intermediate the restriction and the brake cylinder for controlling the supply of fluid through said passage, and a by-pass passage extending around said valve means through which fluid may flow to the brake cylinder.

5. In a vehicle fluid pressure brake equipment, in combination, a plurality of brake cylinders, application means for supplying fluid under pressure to a communication through which fluid under pressure may be supplied to said brake cylinders, and a valve device for controlling the supply of fluid from said communication to one of said brake cylinders, said valve device comprising a body having a passage therein through which fluid is supplied from said communication to said brake cylinder, said passage having a restriction interposed therein, a timing reservoir, means for supplying fluid to said reservoir at a restricted rate from a point in said passage on the side of the restriction remote from the brake cylinder, valve means subject to the opposing pressures of the fluid in said timing reservoir and of the fluid in a chamber constantly open to said passage at a point in said passage intermediate the restriction and the brake cylinder for controlling the supply of fluid through said passage, and a by-pass passage extending around said valve means through which fluid may flow to the brake cylinder at a less rapid rate than through said restriction.

6. In a vehicle fluid pressure brake equipment, in combination, braking means operative on the supply of fluid under pressure to effect an application of the brakes, application means for supplying fluid under pressure to a communication through which fluid under pressure may be supplied to said braking means, said communication having a restriction interposed therein, a timing reservoir, means for supplying fluid at a restricted rate to said timing reservoir from said communication at a point therein intermediate the restriction and the application means, a body having a chamber therein always open to said communication at a point therein intermediate the restriction and the braking means, a movable abutment subject to the opposing pressures of the fluid in said chamber and of the fluid in said timing reservoir, valve means operated by said abutment for controlling the supply of fluid to said braking means through said communication, and biasing means yieldingly urging the valve means to a position to permit flow of fluid through said communication.

7. In a vehicle fluid pressure brake equipment, in combination, braking means operative on an increase in fluid pressure to effect an application of the brakes, application means for supplying fluid under pressure to and for releasing fluid under pressure from a communication through which fluid under pressure may be supplied to and released from said braking means, said communication having a restriction interposed therein, a timing reservoir, means for supplying fluid to said timing reservoir at a restricted rate from said communication at a point therein intermediate the application means and said restriction, valve means for controlling the supply of fluid to said braking means through said communication, said valve means being subject to the opposing pressures of the fluid in said timing reservoir and of the fluid in a chamber open to said communication at a point therein intermediate the restriction and the braking means, and a check valve operative to prevent flow of fluid from said communication to the timing reservoir and to permit flow of fluid from the timing reservoir to said communication.

8. In a vehicle fluid pressure brake equipment, in combination, braking means operative on an increase in fluid pressure to effect an application of the brakes, application means for supplying fluid under pressure to and for releasing fluid under pressure from a communication through which fluid under pressure may be supplied to and released from said braking means, said communication having a restriction interposed therein, a timing reservoir, means for supplying fluid to said timing reservoir at a restricted rate from said communication at a point therein intermediate the application means and said restriction, valve means for controlling the supply of fluid to said braking means through said communication, said valve means being subject to the opposing pressures of the fluid in said timing reservoir and of the fluid in a chamber open to said communication at a point therein intermediate the restriction and the braking means, and a check valve operative to prevent flow of fluid from said communication to the timing reservoir and to permit flow of fluid from the timing reservoir to said communication at a point in said communication intermediate the application means and said restriction.

9. In a vehicle fluid pressure brake equipment, in combination, braking means operative on an increase in fluid pressure to effect an application of the brakes, application means for supplying fluid under pressure to and for releasing fluid under pressure from a communication through which fluid under pressure may be supplied to and released from said braking means, said communication having a restriction interposed therein, a timing reservoir, valve means subject to the opposing pressures of the fluid in said timing reservoir and of the fluid in a chamber open to said communication at a point therein intermediate the restriction and the braking means for controlling the flow of fluid through said communication, means for supplying fluid to said timing reservoir at a restricted rate from said communication at a point therein intermediate the restriction and the application means, a passage connecting the timing reservoir with said communication at a point therein intermediate the restriction and the application means, and a check valve operative to permit fluid to flow from the timing reservoir to said communication and to prevent flow of fluid from said communication to the timing reservoir through said passage.

10. In a vehicle fluid pressure brake equipment, in combination, braking means operative on an increase in fluid pressure to effect an application of the brakes, application means for supplying fluid under pressure to and for releasing fluid under pressure from a communication through which fluid under pressure may be supplied to and released from said braking means, said communication having a restriction interposed therein, a timing reservoir, means for supplying fluid to said timing reservoir at a restricted rate from said communication at a point therein intermediate the application means and the restriction, valve means subject to the opposing pressures of the fluid in the timing reservoir and of the fluid in a chamber open to said communication at a point therein intermediate the restriction and the braking means for controlling the flow of fluid through said communication, a by-pass passage extending around said restriction, and a check valve operative to prevent flow of fluid from the application means to the braking means through said passage and to permit flow of fluid from the braking means to the application means through said passage.

11. In a vehicle fluid pressure brake equipment, in combination, braking means operative on an increase in fluid pressure to effect an application of the brakes, application means for supplying fluid under pressure to and for releasing fluid under pressure from a communication through which fluid under pressure may be supplied to and released from said braking means, said communication having a restriction interposed therein, a timing reservoir, means for supplying fluid to said timing reservoir at a restricted rate from said communication at a point therein intermediate the application means and the restriction, valve means subject to the opposing pressures of the fluid in the timing reservoir and of the fluid in a chamber open to said communication at a point therein intermediate the restriction and the braking means for controlling the flow of fluid through said communication, a by-pass passage extending around said valve means, and a check valve operative to prevent flow of fluid from the application means to the braking means through said passage and to permit flow of fluid from the braking means to the application means through said passage.

12. In a vehicle fluid pressure brake equipment, in combination, braking means operated on an increase in the pressure of the fluid supplied thereto to effect an application of the brakes, application means for supplying fluid under pressure to a communication through which fluid under pressure may be supplied to said braking means, said communication having a restriction interposed therein, a timing reservoir, means for supplying fluid to said timing reservoir at a restricted rate from said communication at a point therein intermediate the application means and the restriction, valve means subject to the opposing pressures of the fluid in the timing reservoir and of the fluid in an operating chamber for controlling the flow of fluid through said communication, and means for supplying fluid to said operating chamber from said communication at a point therein intermediate the valve means and the braking means and on the side of the restriction adjacent the braking means.

13. In a vehicle fluid pressure brake equipment, in combination, braking means operated on an increase in the pressure of the fluid supplied thereto to effect an application of the brakes, application means for supplying fluid under pressure to a communication through which fluid under pressure may be supplied to said braking means, said communication having a restriction interposed therein, a timing reservoir, means for supplying fluid to said timing reservoir at a restricted rate from said communication at a point therein intermediate the application means and the restriction, valve means subject to the opposing pressures of the fluid in the timing reservoir and of the fluid in an operating chamber and controlling the flow of fluid through said communication at a point therein intermediate the restriction and the braking means, and means for supplying fluid to said operating chamber from said communication at a point therein intermediate said valve means and said braking means.

14. In a vehicle fluid pressure brake equipment, in combination, braking means operated on an increase in the pressure of the fluid supplied thereto to effect an application of the brakes, application means for supplying fluid under pressure to a communication through which fluid under pressure may be supplied to said braking means, said communication having a restriction interposed therein, a timing reservoir, means for supplying fluid to said timing reservoir at a restricted rate from said communication at a point therein intermediate the application means and the restriction, valve means subject to the opposing pressures of the fluid in the timing reservoir and of the fluid in an operating chamber and controlling the flow of fluid through said communication at a point therein intermediate the restriction and the braking means, means for supplying fluid to said operating chamber from said communication at a point therein intermediate said valve means and said braking means, and a by-pass passage extending around said valve means and through which fluid supplied to said communication may flow to said braking means.

15. In a vehicle fluid pressure brake equipment, in combination, braking means operated on an increase in the pressure of the fluid supplied thereto to effect an application of the brakes, application means for supplying fluid under pressure to a communication through which fluid under pressure may be supplied to said braking means, said communication having a restriction interposed therein, a timing reservoir, means for supplying fluid to said timing reservoir at a restricted rate from said communication at a point therein intermediate the application means and the restriction, valve means subject to the opposing pressures of the fluid in the timing reservoir and of the fluid in an operating chamber and controlling the flow of fluid through said communication at a point therein intermediate the restriction and the braking means, means for supplying fluid to said operating chamber from said communication at a point therein intermediate said valve means and said braking means, a by-pass passage extending around said valve means, and a check valve operative to permit fluid to flow from the braking means to the application means and to prevent flow of fluid from the application means to the braking means through said passage.

16. In a control device for regulating the supply of fluid from an application device to a brake cylinder, a body having a communication therein adapted to have one end connected to said application device and to have the other end thereof connected to the brake cylinder, said communication having a restriction therein, the body having associated therewith a timing reservoir and an operating chamber, means for supplying fluid to said timing reservoir from said communication at a point therein on the side of the restriction adjacent the end of the communication adapted to be connected to the application device, means for supplying fluid to said operating chamber from said communication at a point therein on the side of the restriction adjacent the end of the communication adapted to be connected to the brake cylinder, and valve means subject to the opposing pressures of the fluid in said timing reservoir and of the fluid in the operating chamber for controlling the flow of fluid through said communication.

17. In a vehicle fluid pressure brake equipment, in combination, a brake cylinder, a source of fluid pressure supply, valve means for controlling a passage having a restriction and through which fluid under pressure is supplied from said source to the brake cylinder, a timing reservoir, said valve means being subject to the opposing pressures of the fluid in the timing reservoir and of the fluid in a chamber alway open to said passage at a point in said passage at the brake cylinder side of said restriction, means for supplying fluid to said timing reservoir at a restricted rate from the supply side of said passage, said valve means being operated upon the creation of a predetermined differential between the fluid pressures acting on said valve means to close communication through said passage.

18. In a vehicle fluid pressure brake equipment, in combination, a plurality of brake cylinders, application means for supplying fluid under pressure to a supply passage through which fluid under pressure may be supplied to said brake cylinders, and means for restricting the supply of fluid to one of said brake cylinders after a predetermined time interval if the pressure of the fluid therein fails to build up at the normal rate on the supply of fluid thereto, said means comprising a restriction interposed in the communication leading from the supply passage to said brake cylinder, a timing reservoir, valve means subject to the opposing pressures of the fluid in the timing reservoir and of the fluid in a chamber open to said communication at a point therein intermediate the restriction and the brake cylinder and controlling the flow of fluid through said communication, said valve means being operative to normally open said communication and being operative to restrict the flow of fluid through said communication on a predetermined increase in the pressure of the fluid in the timing reservoir above that in said chamber, and means for supplying fluid from said communication at a point therein intermediate the restriction and the application means to said timing reservoir only at a restricted rate to thereby slowly increase the pressure in said timing reservoir and thus delay the operation of said valve means to restrict flow of fluid to the brake cylinder until after flow of fluid to the brake cylinder has continued for a period of time long enough to normally enable the pressure of the fluid in the brake cylinder to increase substantially to the pressure supplied by the application means.

19. In a vehicle fluid pressure brake equipment, in combination, a source of fluid under pressure, a brake cylinder, application means for supplying fluid under pressure from said source to a communication through which fluid under pressure may be supplied to the brake cylinder through a restriction, a volume chamber, means for supplying fluid under pressure to said volume chamber at a restricted rate from a point in said communication intermediate said restriction and the application means, and valve means subject to the opposing pressures of the fluid in said volume chamber and of the fluid in an operating chamber for controlling the flow of fluid through said communication, said operating chamber being always open to said communication at a point therein intermediate the restriction and the brake cylinder.

20. In a vehicle fluid pressure brake equipment, in combination, a source of fluid under pressure, a brake cylinder, application means for supplying fluid under pressure from said source to a communication through which fluid under pressure may be supplied to the brake cylinder through a restriction, a volume chamber, means for supplying fluid under pressure to said volume chamber at a restricted rate from a point in said communication intermediate said restriction and the application means, and valve means subject to the opposing pressures of the fluid in said volume chamber and of the fluid in an operating chamber for controlling the flow of fluid through said communication at a point therein intermediate the restriction and the brake cylinder, said operating chamber being always open to said communication at a point therein intermediate the valve means and the brake cylinder.

21. In a vehicle fluid pressure brake equipment, in combination, a source of fluid under pressure, a brake cylinder, application means for supplying fluid under pressure from said source to a communication through which fluid under pressure may be supplied to the brake cylinder through a restriction, a pressure chamber, means for supplying fluid under pressure to said pressure chamber from a point in said communication intermediate said restriction and the application means, an operating chamber, and valve means subject to the opposing pressures of the fluid in the pressure chamber and of the fluid in said operating chamber for controlling the flow of fluid through said communication, said valve means being operative to restrict the flow of fluid through said communication upon a predetermined increase in the pressure of the fluid in the pressure chamber above the pressure of the fluid in the operating chamber, said operating chamber being constantly open to said communication at a point therein intermediate the restriction and the brake cylinder.

22. In a vehicle fluid pressure brake equipment, in combination, a source of fluid under pressure, a brake cylinder, application means for supplying fluid under pressure from said source to a communication through which fluid under pressure may be supplied to the brake cylinder through a restriction, a pressure chamber, means for supplying fluid under pressure to said pressure chamber from a point in said communication intermediate said restriction and the application means, an operating chamber, and valve means subject to the opposing pressures of the fluid in the pressure chamber and of the fluid in said operating chamber for controlling the flow of fluid through said communication at a point therein intermediate the restriction and the brake cylinder, said valve means being operative upon a predetermined increase in the pressure of the fluid in the pressure chamber above the pressure of the fluid in the operating chamber to restrict the flow of fluid through said communication, said operating chamber being always open to said communication at a point therein intermediate the valve means and the brake cylinder.

23. In a vehicle fluid pressure brake equipment, in combination, a brake cylinder, a source of fluid under pressure, application means for supplying fluid under pressure from said source to a communication through which fluid may be supplied to said brake cylinder, said application means being also operative to release fluid from said communication, valve means subject to the opposing pressures of the fluid in a pressure chamber and of the fluid in an operating chamber for controlling the rate of flow of fluid through said communication, said valve means being operative on an increase in the pressure of the fluid in the pressure chamber to a predetermined value above that in the operating chamber to restrict the rate of flow of fluid through said communication, means for supplying fluid at a restricted rate to said pressure chamber from said communication, means for supplying fluid to said operating chamber from said communication at a point therein intermediate the brake cylinder and the point in said communication from which fluid is supplied to the pressure chamber, means associated with said communication and operative on the flow of fluid through said communication to the brake cylinder to cause a reduction in the pressure of the fluid in the portion of the communication from which fluid is supplied to the operating chamber below the pressure of the fluid in the portion of the communication from which fluid is supplied to the pressure chamber, a passage through which fluid may flow from the pressure chamber to said communication at a rapid rate, and a check valve for preventing flow of fluid from said communication to the pressure chamber through said passage.

CLYDE C. FARMER.